United States Patent
Wu et al.

(10) Patent No.: US 11,716,713 B2
(45) Date of Patent: Aug. 1, 2023

(54) MODULATION AND CODING SCHEME DETERMINATION FOR SIDELINK COMMUNICATION

(71) Applicant: QUALCOMM Incorporated, San Diego, CA (US)

(72) Inventors: Shuanshuan Wu, San Diego, CA (US); Kapil Gulati, Belle Mead, NJ (US); Gabi Sarkis, San Diego, CA (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 16/949,366

(22) Filed: Oct. 27, 2020

(65) Prior Publication Data

US 2021/0144707 A1     May 13, 2021

Related U.S. Application Data

(60) Provisional application No. 62/932,827, filed on Nov. 8, 2019.

(51) Int. Cl.
*H04W 72/0453* (2023.01)
*H04W 72/02* (2009.01)
*H04W 92/18* (2009.01)

(52) U.S. Cl.
CPC ....... *H04W 72/0453* (2013.01); *H04W 72/02* (2013.01); *H04W 92/18* (2013.01)

(58) Field of Classification Search
CPC . H04W 72/0453; H04W 72/02; H04W 92/18; H04L 1/0009; H04L 1/0023; H04L 1/0003
See application file for complete search history.

(56) References Cited

U.S. PATENT DOCUMENTS

| | | | |
|---|---|---|---|
| 2015/0036590 A1* | 2/2015 | Lahetkangas | H04L 27/04 370/328 |
| 2015/0195818 A1* | 7/2015 | Davydov | H04L 5/0046 370/329 |
| 2016/0365944 A1* | 12/2016 | Blankenship | H04W 4/70 |
| 2019/0253121 A1* | 8/2019 | Islam | H04L 1/0016 |
| 2020/0099467 A1* | 3/2020 | Wang | H04L 1/0057 |
| 2021/0050930 A1* | 2/2021 | Li | H04L 1/0007 |
| 2021/0136810 A1* | 5/2021 | Kung | H04W 72/10 |
| 2021/0144707 A1* | 5/2021 | Wu | H04W 72/0453 |

(Continued)

FOREIGN PATENT DOCUMENTS

WO     2018203990 A1     11/2018

OTHER PUBLICATIONS

3GPP TS 36.213 (Year: 2019).*

(Continued)

*Primary Examiner* — Yu-Wen Chang
(74) *Attorney, Agent, or Firm* — Harrity & Harrity, LLP

(57) ABSTRACT

Various aspects of the present disclosure generally relate to wireless communication. In some aspects, a user equipment (UE) may identify one or more spectral efficiency ranges that are to be used to select a modulation and coding scheme (MCS) for a sidelink communication. The UE may transmit the sidelink communication using the MCS selected based at least in part on the one or more spectral efficiency ranges. Numerous other aspects are provided.

30 Claims, 8 Drawing Sheets

(56) References Cited

U.S. PATENT DOCUMENTS

| | | | | |
|---|---|---|---|---|
| 2021/0234571 A1* | 7/2021 | Wang | ...................... | H04L 1/0003 |
| 2021/0234628 A1* | 7/2021 | Nakamura | ............ | H04L 1/0061 |
| 2021/0243784 A1* | 8/2021 | Goto | ...................... | H04L 1/0016 |
| 2021/0273759 A1* | 9/2021 | Maki | ...................... | H04W 72/04 |
| 2021/0314962 A1* | 10/2021 | Ashraf | .................. | H04W 24/10 |
| 2022/0060276 A1* | 2/2022 | Chen | ...................... | H04L 5/0044 |

OTHER PUBLICATIONS

3GPP TS 36.321 (Year: 2019).*

Huawei, et al., "Coexistence of R14 UEs and R15 UEs Regarding 64QAM", 3GPP TSG RAN WG2 Meeting #101bis, 3GPP Draft; R2-1804633, Coexistence of R14 UEs and R15 UEs regarding 64QAM, 3rd Generation Partnership Project (3GPP), Mobile Competence Centre, 650, Route Des Lucioles; F-06921 Sophia-Antipolis Cedex, France, vol. RAN WG2, No. Sanya, China; Apr. 16, 2018-Apr. 20, 2018, Apr. 14, 2018 (Apr. 14, 2018), pp. 1-3, XP051428350, Retrieved from the Internet: URL: http://www.3gpp.org/ftp/Meetings%5F3GPP%5FSYNC/RAN2/Docs/ [retrieved on Apr. 14, 2018].

Intel Corporation: "CQI/MCS for NR", 3GPP TSG-RAN WG1 Meeting #bis, 3GPP Draft; R1-1717370-CQI and MCS for NR, 3rd Generation Partnership Project (3GPP), Mobile Competence Centre; 650, Route Des Lucioles F-06921 Sophia-Antipolis Cedex; France, vol. RAN WG1, No. Prague, CZ, Oct. 9, 2017-Oct. 13, 2017, Oct. 8, 2017 (Oct. 8, 2017), pp. 1-6, XP051340560, Retrieved from the Internet: URL: http://www.3gpp.org/ftp/Meetings_3GPP_SYNC/RAN1/Docs/ [retrieved on Oct. 8, 2017] Section "Discussion on CQI Table Design", Section "Discussion on MCS Table Design", Proposal 8.

International Search Report and Written Opinion—PCT/US2020/070714—ISA/EPO—dated Feb. 11, 2021.

Nokia, et al., "Discussions on Support of 64QAM for LTE V2X Sidelink," 3GPP Draft, 3GPP TSG RAN WG1 Meeting #92bis, R1-1804258-NOKIA-LTE EV2X Discussions On Support of 64QAM for LTE V2X Sidelink, 3rd Generation Partnership Project (3GPP), Mobile Competence Centre, 650, Route Des Lucioles, F-06921, Sophia-Antipolis Cedex, France, vol. RAN WG1. No. Sanya, China, Apr. 16, 2018-Apr. 20, 2018, Apr. 15, 2018 (Apr. 15, 2018), XP051426546, 6 pages, Retrieved from the Internet: URL: http://www.3gpp.org/ftp/Meetings%5F3GPP%5FSYNC/RAN1/Docs/ [retrieved on Apr. 15, 2018] * section 2 * table 1.

* cited by examiner

MODULATION AND CODING SCHEME DETERMINATION FOR SIDELINK COMMUNICATION

CROSS-REFERENCE TO RELATED APPLICATION

This Patent Application claims priority to U.S. Provisional Patent Application No. 62/932,827, filed on Nov. 8, 2019, entitled "MODULATION AND CODING SCHEME DETERMINATION FOR SIDELINK COMMUNICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for modulation and coding scheme determination for sidelink communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include identifying one or more spectral efficiency ranges that are to be used to select a modulation and coding scheme (MCS) for a sidelink communication; and transmitting the sidelink communication using the MCS selected based at least in part on the one or more spectral efficiency ranges.

In some aspects, a method of wireless communication, performed by a base station, may include determining a configuration for one or more spectral efficiency ranges that are to be used by a UE to select an MCS for a sidelink communication; and transmitting the configuration to the UE to enable the UE to select the MCS for the sidelink communication based at least in part on the one or more spectral efficiency ranges.

In some aspects, a UE for wireless communication may include memory and one or more processors operatively coupled to the memory. The memory and the one or more processors may be configured to identify one or more spectral efficiency ranges that are to be used to select an MCS for a sidelink communication; and transmit the sidelink communication using the MCS selected based at least in part on the one or more spectral efficiency ranges.

In some aspects, a base station for wireless communication may include memory and one or more processors operatively coupled to the memory. The memory and the one or more processors may be configured to determine a configuration for one or more spectral efficiency ranges that are to be used by a UE to select an MCS for a sidelink communication; and transmit the configuration to the UE to enable the UE to select the MCS for the sidelink communication based at least in part on the one or more spectral efficiency ranges.

In some aspects, a non-transitory computer-readable medium may store one or more instructions for wireless communication. The one or more instructions, when executed by one or more processors of a UE, may cause the one or more processors to: identify one or more spectral efficiency ranges that are to be used to select an MCS for a sidelink communication; and transmit the sidelink communication using the MCS selected based at least in part on the one or more spectral efficiency ranges.

In some aspects, a non-transitory computer-readable medium may store one or more instructions for wireless communication. The one or more instructions, when executed by one or more processors of a base station, may cause the one or more processors to: determine a configuration for one or more spectral efficiency ranges that are to be used by a UE to select an MCS for a sidelink communication; and transmit the configuration to the UE to enable the UE to select the MCS for the sidelink communication based at least in part on the one or more spectral efficiency ranges.

In some aspects, an apparatus for wireless communication may include means for identifying one or more spectral efficiency ranges that are to be used to select an MCS for a sidelink communication; and means for transmitting the sidelink communication using the MCS selected based at least in part on the one or more spectral efficiency ranges.

In some aspects, an apparatus for wireless communication may include means for determining a configuration for one or more spectral efficiency ranges that are to be used by a UE to select an MCS for a sidelink communication; and means for transmitting the configuration to the UE to enable the UE to select the MCS for the sidelink communication based at least in part on the one or more spectral efficiency ranges.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
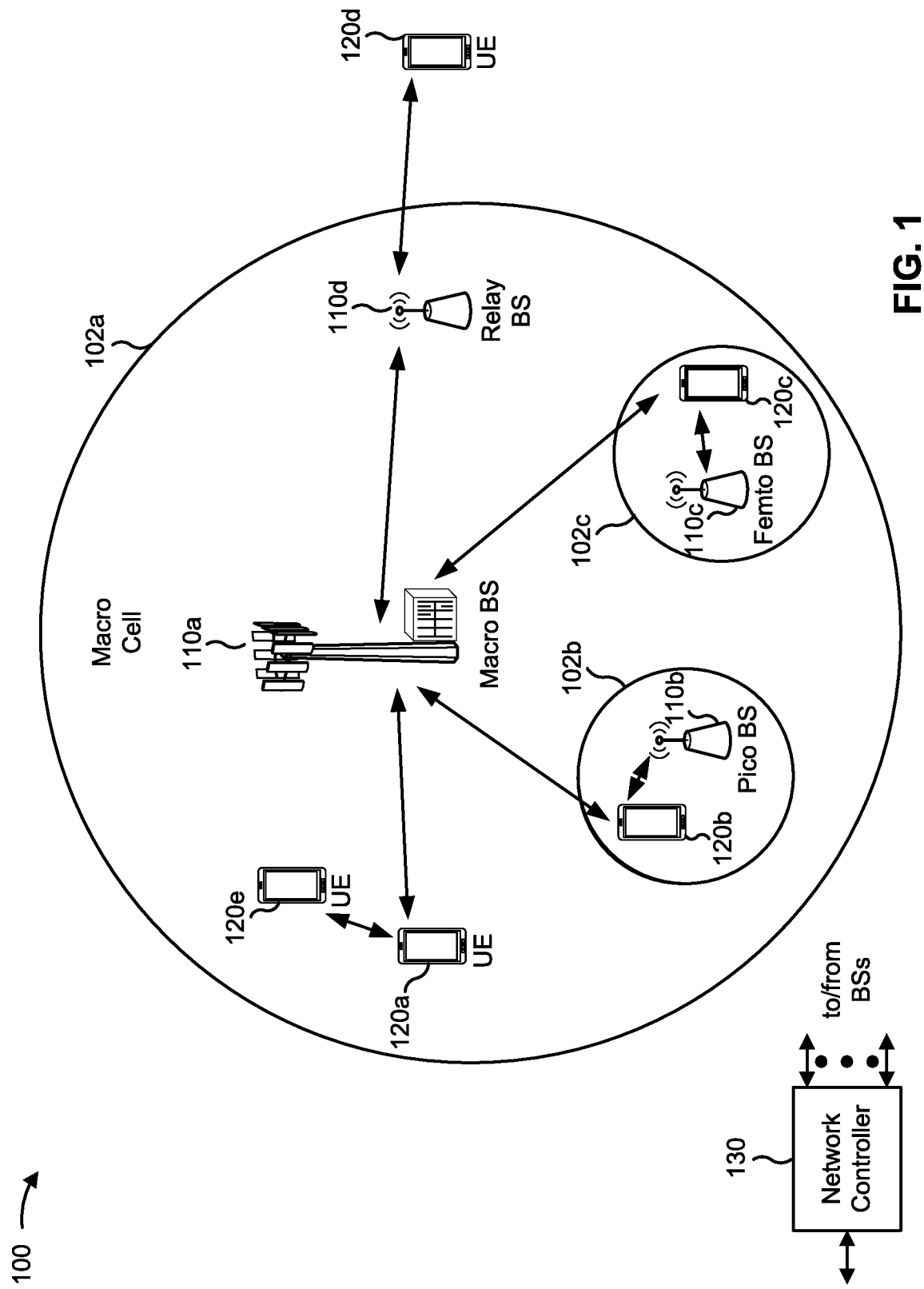
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay base station 110d may communicate with macro BS 110a and a UE 120d in order to facilitate communication between BS 110a and UE 120d, A relay base station may also be referred to as a relay BS, a relay station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
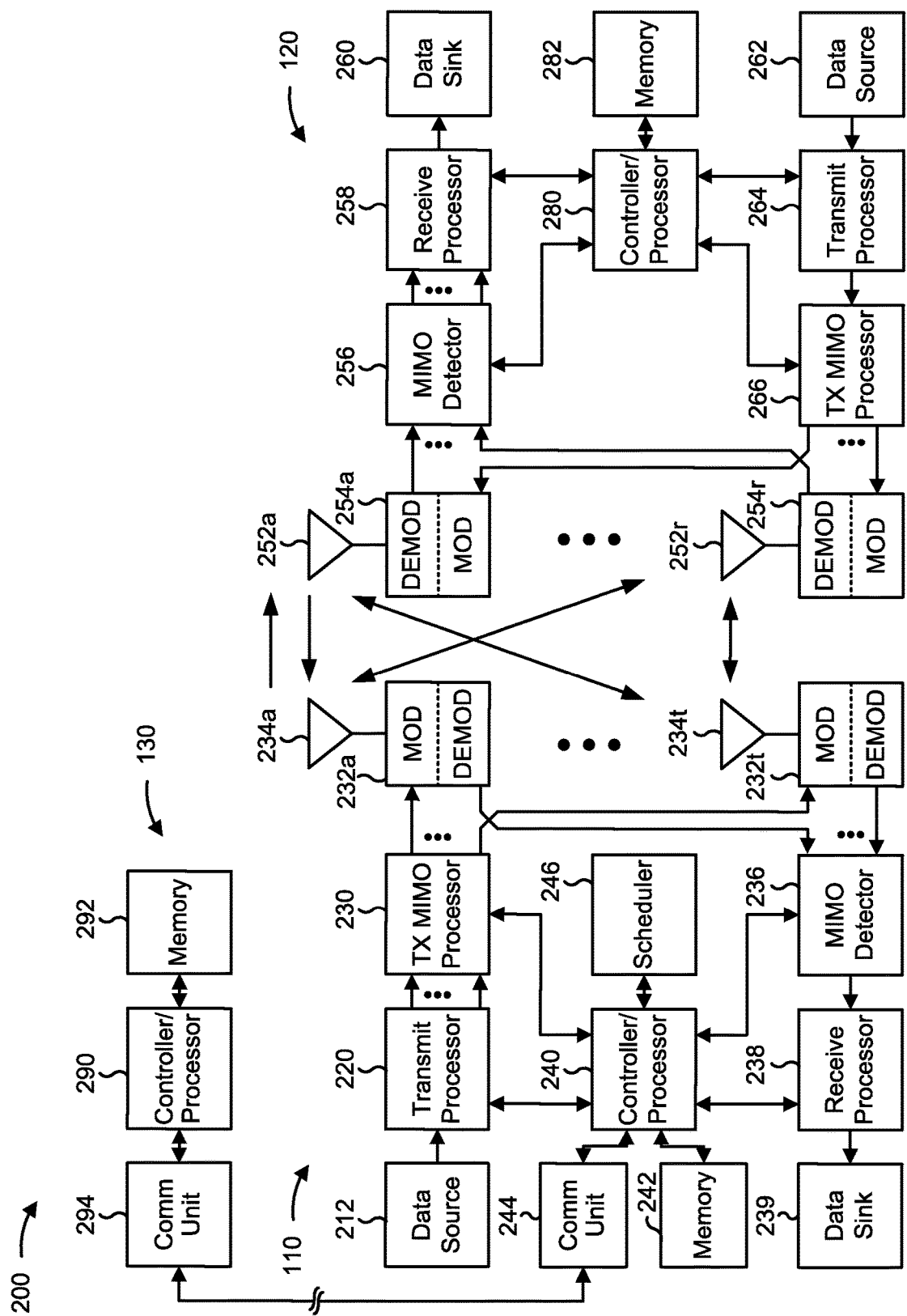
FIG. 2 is a diagram illustrating an example of a base station in communication with a UE in a wireless communication network, in accordance with various aspects of the present disclosure.

FIG. 2 is a diagram illustrating a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with modulation and coding scheme (MCS) determination for sidelink communication, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5, process 600 of FIG. 6, and/or other processes as described herein. A scheduler 246 may schedule UEs for data transmission on the downlink and/or uplink.

In some aspects, UE 120 may include means for identifying one or more spectral efficiency ranges that are to be used to select an MCS for a sidelink communication, means for transmitting the sidelink communication using the MCS selected based at least in part on the one or more spectral efficiency ranges, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a configuration for one or more spectral efficiency ranges that are to be used by a UE to select an MCS for a sidelink communication, means for transmitting the configuration to the UE to enable the UE to select the MCS for the sidelink communication based at least in part on the one or more spectral efficiency ranges, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
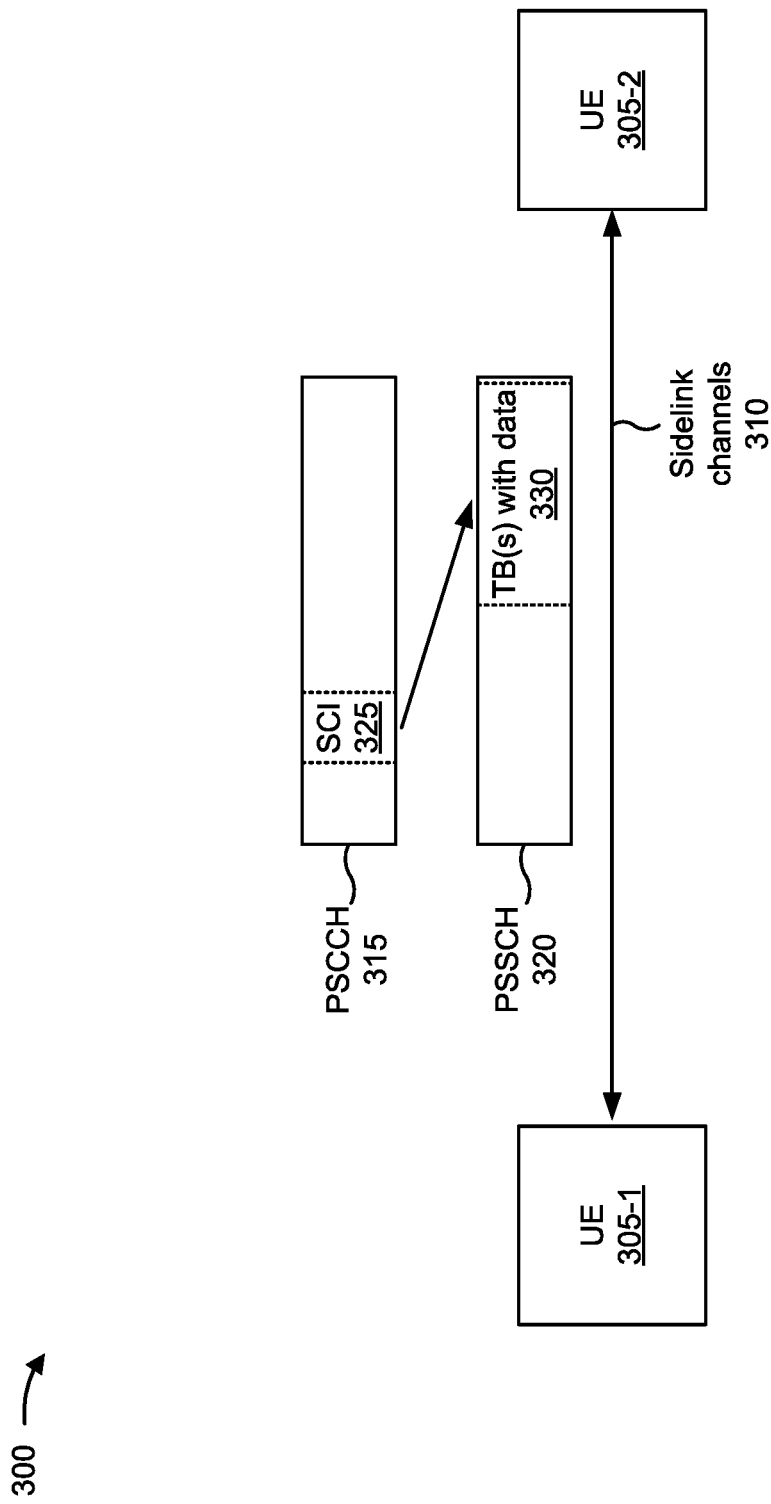
FIG. 3 is a diagram illustrating an example of communications via a sidelink, in accordance with various aspects of the present disclosure.

FIG. 3 is a diagram illustrating an example 300 of communications via a sidelink, in accordance with certain aspects of the present disclosure.

As shown in FIG. 3, a first UE 305-1 may communicate with a second UE 305-2 (and one or more other UEs 305) using device-to-device (D2D) communications via one or more sidelink channels 310. In some aspects, the UEs 305 may correspond to one or more other UEs described elsewhere herein, such as UE 120 and/or the like. In some aspects, the sidelink channel 310 may use a PC5 interface and/or may operate in a high frequency band (e.g., the 5.9 GHz band). Additionally, or alternatively, the UEs 305 may synchronize timing of transmission time intervals (e.g., frames, subframes, slots, and/or the like) using global navigation satellite system (GNSS) timing. The UEs 305 may transmit communications (e.g., one-to-many broadcasts and/or multicast transmissions) using the sidelink channel 310.

As further shown in FIG. 3, the sidelink channel 310 may include a physical sidelink control channel (PSCCH) 315 and a physical sidelink shared channel (PSSCH) 320. The PSCCH 315 may be used to communicate control information, similar to a physical downlink control channel (PDCCH) and/or a physical uplink control channel (PUCCH) used for communications with a base station 110. The PSSCH 320 may be used to communicate data, similar to a physical downlink shared channel (PDSCH) and/or a physical uplink shared channel (PUSCH) used for communications with a base station 110. For example, the PSCCH 315 may carry sidelink control information (SCI) 325, which may indicate various control information used for sidelink communications, such as one or more resources (e.g., time and/or frequency resources) where a transport block (TB) 330 that includes data is carried on the PSSCH 320. In some cases, the TB 330 may include vehicle-to-everything (V2X) data, such as a basic safety message (BSM), a traffic information message (TIM), a signal phase and time (SPAT) message, a MAP message to convey geographic road information, a cooperative awareness message (CAM), a distributed environment notification message (DENM), an in-vehicle information (IVI) message, and/or the like.

In some aspects, the sidelink channel 310 may use resource pools. For example, a scheduling assignment (e.g., included in SCI 325) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using transmission mode 3, where resource selection and/or scheduling is performed by a base station 110. In some aspects, a UE 305 may operate using transmission mode 4, where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of communications based at least in part on the measurement(s).

Additionally, or alternatively, the UE 305 may perform resource selection and/or scheduling using SCI 325 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In transmission mode 4, a UE 305 may generate sidelink grants, and may transmit the grants in SCI 325. A sidelink grant may indicate, for example, one or more parameters (e.g., transmission parameters) to be used for an upcoming transmission, such as one or more resource blocks to be used for the upcoming transmission on the PSSCH 320 (e.g., for TBs 330), one or more subframes to be used for the upcoming transmission, a modulation and coding scheme (MCS) to be used for the upcoming transmission, and/or the like. In some aspects, a UE 305 may generate a sidelink grant that indicates one or more parameters for semi-persistent scheduling (SPS), such as a periodicity of a transmission (e.g., a periodic V2X message, such as a safety message and/or the like). Additionally, or alternatively, the UE 305 may generate a sidelink grant for event-driven scheduling, such as for an on-demand message.

In sidelink communications, a UE 305 may be configured with an MCS table that identifies a set of MCSs from which the UE 305 may select an MCS. The MCS, which may be identified by an index, may be associated with a modulation order, a target code rate, a spectral efficiency, and/or the like. In some cases, the UE 305 may be configured to select from only a subset of MCSs of the MCS table. For example, a base station 110 may determine that the UE 305 is to use a particular subset of MCSs of the MCS table (e.g., based on a level of congestion associated with sidelink resources), and may transmit a configuration to the UE 305 that indicates the particular subset of MCSs.

In some cases, the UE 305 may be configured with multiple MCS tables that each identify a set of MCSs from which the UE 305 may select an MCS for sidelink communications. In such cases, the UE 305 may be configured with different subsets of MCSs for the multiple MCS tables, in a manner similar to that described above. However, the configuration of multiple subsets of MCSs may be inefficient, particularly in sidelink communications where a level of congestion of sidelink resources may change frequently due to UE mobility.

Some techniques and apparatuses described herein enable a UE to select an MCS from multiple MCS tables (e.g., multiple sets of MCSs) with improved efficiency. In some aspects, the UE may be configured with one or more spectral efficiency ranges that are to be used to select an MCS. In this way, the UE may select an MCS, associated with a spectral efficiency within the one or more spectral efficiency ranges, from one or more of the multiple MCS tables, thereby eliminating a need for the UE to be configured with different subsets of MCSs for the multiple MCS tables.

Figure 4:
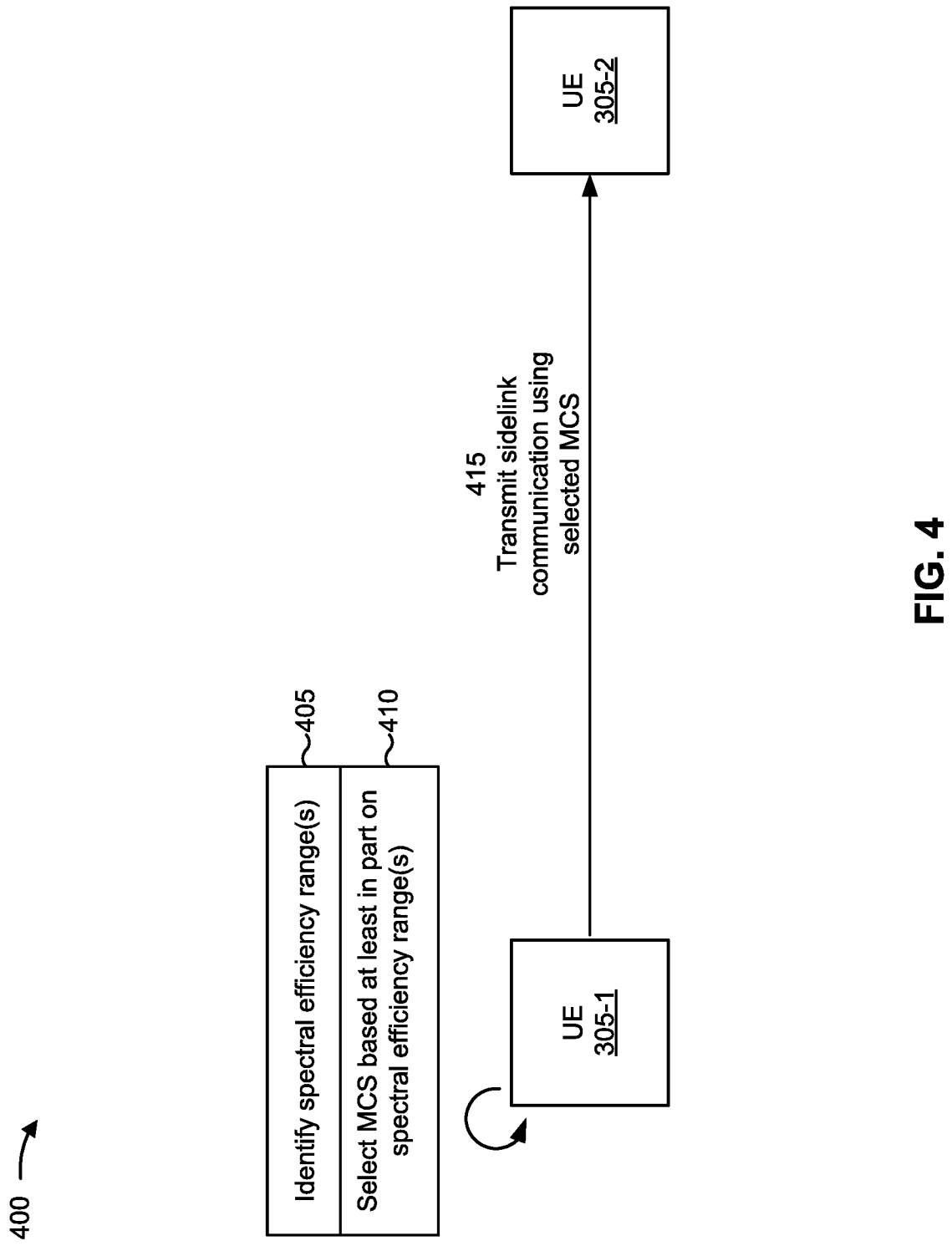
FIG. 4 is a diagram illustrating an example of modulation and coding scheme determination for sidelink communication, in accordance with various aspects of the present disclosure.

FIG. 4 is a diagram illustrating an example 400 of MCS determination for sidelink communication, in accordance with various aspects of the present disclosure. As shown in FIG. 4, the first UE 305-1 may select an MCS, based at least in part on one or more spectral efficiency ranges, and may use the selected MCS to transmit a sidelink communication to the second UE 305-2.

In some aspects, one or more MCS tables may be enabled for UE 305-1. For example, UE 305-1 may be configured (e.g., by a base station 110) with the one or more MCS tables. As another example, UE 305-1 and UE 305-2 may negotiate which MCS tables are to be enabled for UE 305-1 in connection with the sidelink communication. An MCS table may identify a set of MCSs from which UE 305-1 may select an MCS for use in sidelink communications. Each MCS, of a set of MCSs, may include a respective spectral efficiency.

In some aspects, UE 305-1 may be configured with one or more spectral efficiency mappings. In some aspects, a spectral efficiency mapping may map spectral efficiency identifiers (e.g., indices) to spectral efficiency values. For example, according to the spectral efficiency mapping, an index 0 may be mapped to a spectral efficiency value of 0.23, an index 1 may be mapped to a spectral efficiency value of 1.325, an index 2 may be mapped to a spectral efficiency value of 2.6, and so forth. In some aspects, a spectral efficiency mapping may map spectral efficiency identifiers (e.g., indices) to spectral efficiency ranges. For example, according to the spectral efficiency mapping, an index 0 may be mapped to a spectral efficiency range of 0 to 0.23, an index 1 may be mapped to a spectral efficiency range of 0.23 to 1.325, an index 2 may be mapped to a spectral efficiency range of 1.2 to 2.6, and so forth. In some aspects, each spectral efficiency range may be unique or multiple spectral efficiency ranges may overlap.

As shown in FIG. 4, and by reference number 405, UE 305-1 may identify one or more spectral efficiency ranges that are to be used by UE 305-1 to select an MCS. In some aspects, a spectral efficiency range identified by UE 305-1 may be associated with a first index value and a second index value that correlate to a mapping of spectral efficiency indices to spectral efficiency values, as described above. Accordingly, UE 305-1 may determine the spectral efficiency range based at least in part on the first index value and the second index value according to the mapping (e.g., the first index value and the second index value may correspond to a lower bound and an upper bound of the spectral efficiency range). In some aspects, a spectral efficiency range identified by UE 305-1 may be associated with an index value that correlates to a mapping of spectral efficiency indices to spectral efficiency ranges, as described above. Accordingly, UE 305-1 may determine the spectral efficiency range based at least in part on the index value according to the mapping.

In some aspects, UE 305-1 may receive (e.g., in a system information block, via radio resource control signaling, and/or the like) a configuration from a base station 110 that indicates one or more spectral efficiency ranges (e.g., by index value(s)), and UE 305-1 may identify the one or more spectral efficiency ranges based at least in part on the configuration. In such cases, base station 110 may determine the one or more spectral efficiency ranges that are to be used by UE 305-1. For example, base station 110 may determine the one or more spectral efficiency ranges based at least in part on a measurement associated with a set of resources for sidelink communications (e.g., a sidelink resource pool).

As an example, base station 110 may determine a measurement associated with a CBR, a channel occupancy ratio, an RSSI, and RSRP, an RSRQ, and/or the like. In some aspects, base station 110 may determine a smaller spectral efficiency range, a spectral efficiency range associated with lower spectral efficiencies, and/or the like, when the measurement indicates a higher load level (e.g., a load level satisfying a threshold value) and/or a higher interference level (e.g., an interference level satisfying a threshold value) for the set of resources, and may determine a higher spectral efficiency range, a spectral efficiency range associated with higher spectral efficiencies, and/or the like, when the measurement indicates a lower load level or a lower interference level for the set of resources.

In some aspects, base station 110 may determine the one or more spectral efficiency ranges that are to be used by UE 305-1 based at least in part on a capability of UE 305-1. For example, if UE 305-1 is not capable of communicating using a particular modulation order (e.g., 256 quadrature amplitude modulation (QAM)), base station 110 may determine the one or more spectral efficiency ranges so as to exclude spectral efficiencies associated with the particular modulation order.

In some aspects, UE 305-1 may be configured, or otherwise provisioned, with one or more spectral efficiency ranges (e.g., according to a static configuration), and UE 305-1 may identify the one or more spectral efficiency ranges based at least in part on the configuration. For example, UE 305-1 may be preconfigured with the one or more spectral efficiency ranges (e.g., rather than configured by base station 110). In such a case, the one or more spectral efficiency ranges may be based at least in part on a capability of UE 305-1, as described above.

In some aspects, the one or more spectral efficiency ranges may include a single spectral efficiency range. In such cases, the spectral efficiency range may correspond to (e.g., may be used by UE 305-1 to select one or more MCSs from) one or more sets of MCSs (e.g., one or more MCS tables). In some aspects, the one or more spectral efficiency ranges may include multiple spectral efficiency ranges. In such cases, the multiple spectral efficiency ranges may correspond, respectively, to multiple sets of MCSs. In some aspects, one or more of the multiple spectral efficiency ranges may correspond to one or more of the multiple sets of MCSs.

As shown by reference number 410, UE 305-1 may select an MCS that is to be used for a sidelink communication to UE 305-2 based at least in part on the one or more spectral efficiency ranges. That is, UE 305-1 may select an MCS from one or more sets of MCSs enabled for UE 305-1 (e.g., one or more MCS tables enabled for UE 305-1) based at least in part on the one or more spectral efficiency ranges. In this way, UE 305-1 does not need to be configured with different subsets of MCSs for the one or more sets of MCSs, thereby improving efficiency of MCS selection.

In some aspects, UE 305-1 may have identified a single spectral efficiency range and may be enabled to use a single set of MCSs (e.g., a single MCS table). In such cases, UE 305-1 may select an MCS, from the set of MCSs, that is associated with a spectral efficiency within the spectral efficiency range. In some aspects, UE 305-1 may have identified a single spectral efficiency range and may be enabled to use multiple sets of MCSs (e.g., multiple MCS tables). In such cases, UE 305-1 may select a single set of MCSs from the multiple sets of MCSs (e.g., according to one or more criteria for selecting a set of MCSs), and may select an MCS, from the set of MCSs, that is associated with a spectral efficiency within the spectral efficiency range. Alternatively, UE 305-1 may select respective MCSs, from the multiple sets of MCSs (e.g., one MCS per set of MCSs), that are associated with spectral efficiencies within the spectral efficiency range, and may select (e.g., downselect) an MCS from the respective MCSs (e.g., according to one or more criteria for selecting an MCS).

In some aspects, UE 305-1 may have identified multiple spectral efficiency ranges and may be enabled to use multiple sets of MCSs (e.g., multiple MCS tables). In such cases, UE 305-1 may select a single set of MCSs from the multiple sets of MCSs (e.g., according to one or more criteria for selecting a set of MCSs). The selected set of MCSs may be associated with a spectral efficiency range of the multiple spectral efficiency ranges, and UE 305-1 may select an MCS, from the set of MCSs, that is associated with a spectral efficiency within the spectral efficiency range. Alternatively, UE 305-1 may select respective MCSs, from the multiple sets of MCSs (e.g., one MCS per set of MCSs). Each selected MCS may be associated with a spectral efficiency within a spectral efficiency rage, of the multiple spectral efficiency ranges, that is associated with the set of MCSs from which the MCS was selected. UE 305-1 may select (e.g., downselect) an MCS from the respective MCSs (e.g., according to one or more criteria for selecting an MCS).

In some aspects, UE 305-1 may select an MCS at a medium access control (MAC) layer of UE 305-1. The MAC layer may provide an indication that identifies the selected MCS (e.g., by an index associated with the selected MCS) to a physical layer of UE 305-1, to enable the physical layer to prepare the sidelink communication for transmission using the selected MCS. In some aspects, the indication may also identify the set of MCSs (e.g., the MCS table, such as by an index associated with the MCS table) from which the MCS was selected.

As shown by reference number 415, UE 305-1 may transmit the sidelink communication to UE 305-2 using the selected MCS. For example, UE 305-1 may prepare (e.g., at the physical layer of UE 305-1) the sidelink communication for transmission using the selected MCS, and may transmit the sidelink communication to UE 305-2. In some aspects, UE 305-1 may transmit SCI for the sidelink communication to UE 305-2. The SCI may identify the selected MCS and/or the set of MCSs from which the MCS was selected, to enable UE 305-2 to decode the sidelink communication according to the MCS.

As indicated above, FIG. 4 is provided as an example. Other examples may differ from what is described with respect to FIG. 4.

Figure 5:
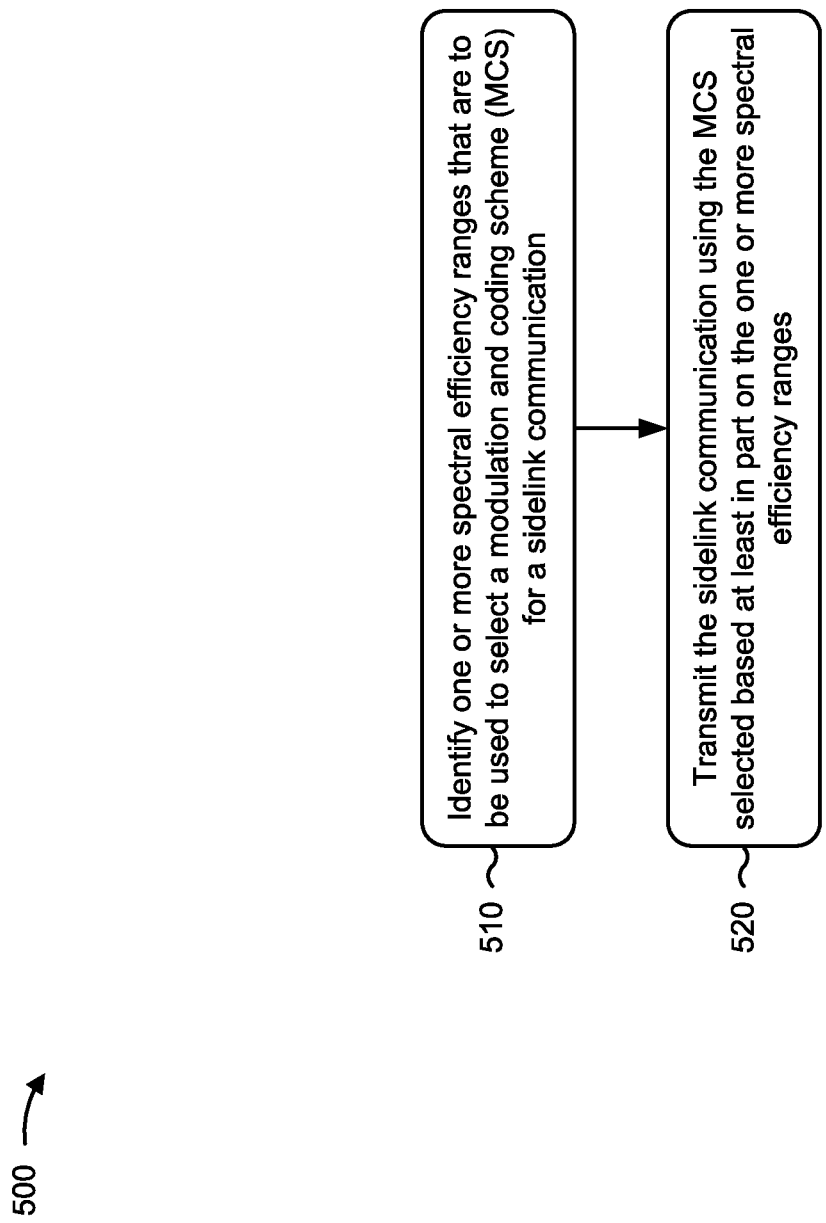
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120 and/or the like) performs operations associated with MCS determination for sidelink communication.

As shown in FIG. 5, in some aspects, process 500 may include identifying one or more spectral efficiency ranges that are to be used to select an MCS for a sidelink communication (block 510). For example, the UE (e.g., using antenna 252, DEMOD 254, MIMO detector 256, receive processor 258, controller/processor 280, and/or the like) may identify one or more spectral efficiency ranges that are to be used to select an MCS for a sidelink communication, as described above.

As further shown in FIG. 5, in some aspects, process 500 may include transmitting the sidelink communication using the MCS selected based at least in part on the one or more spectral efficiency ranges (block 520). For example, the UE (e.g., using controller/processor 280, transmit processor 264, TX MIMO processor 266, MOD 254, antenna 252, and/or the like) may transmit the sidelink communication using the MCS selected based at least in part on the one or more spectral efficiency ranges, as described above.

Process 500 may include additional aspects, such as any single aspect or any combination of aspects described below and/or in connection with one or more other processes described elsewhere herein.

In a first aspect, a spectral efficiency range, of the one or more spectral efficiency ranges, is associated with a first index value and a second index value of a mapping of index values to spectral efficiency values. In a second aspect, alone or in combination with the first aspect, a spectral efficiency range, of the one or more spectral efficiency ranges, is associated with an index value of a mapping of index values to spectral efficiency ranges.

In a third aspect, alone or in combination with one or more of the first and second aspects, process 500 further includes receiving a configuration that indicates the one or more spectral efficiency ranges, and the one or more spectral efficiency ranges are identified based at least in part on the configuration.

In a fourth aspect, alone or in combination with one or more of the first through third aspects, the one or more spectral efficiency ranges are based at least in part on a measurement associated with a set of resources for sidelink communications. In a fifth aspect, alone or in combination with one or more of the first through fourth aspects, the one or more spectral efficiency ranges are based at least in part on a capability of the UE.

In a sixth aspect, alone or in combination with one or more of the first through fifth aspects, one or more sets of MCSs are enabled for the UE, and the MCS is selected from the one or more sets of MCSs.

In a seventh aspect, alone or in combination with one or more of the first through sixth aspects, the one or more spectral efficiency ranges include a single spectral efficiency range. In an eighth aspect, alone or in combination with one or more of the first through seventh aspects, process 500 further includes selecting the MCS from a set of MCSs enabled for the UE, where the MCS is associated with a spectral efficiency within the spectral efficiency range. In a ninth aspect, alone or in combination with one or more of the first through eighth aspects, process 500 further includes selecting a set of MCSs from a plurality of sets of MCSs enabled for the UE, and selecting the MCS from the set of MCSs selected, where the MCS is associated with a spectral efficiency within the spectral efficiency range. In a tenth aspect, alone or in combination with one or more of the first through ninth aspects, process 500 further includes selecting respective MCSs from a plurality of sets of MCSs enabled for the UE, where each MCS is associated with a spectral efficiency within the spectral efficiency range, and selecting the MCS from the respective MCSs.

In an eleventh aspect, alone or in combination with one or more of the first through tenth aspects, the one or more spectral efficiency ranges include a plurality of spectral efficiency ranges, and the plurality of spectral efficiency ranges are associated with a plurality of sets of MCSs enabled for the UE. In a twelfth aspect, alone or in combination with one or more of the first through eleventh aspects, process 500 further includes selecting a set of MCSs from the plurality of sets of MCSs, and selecting the MCS from the set of MCSs selected, where the MCS is associated with a spectral efficiency within a spectral efficiency range, of the plurality of spectral efficiency ranges, that is associated with the set of MCSs. In a thirteenth aspect, alone or in combination with one or more of the first through twelfth aspects, process 500 further includes selecting respective MCSs from the plurality of sets of MCSs, where each MCS is associated with a spectral efficiency within a spectral efficiency range, of the plurality of spectral efficiency ranges, that is associated with a set of MCSs, of the plurality of sets of MCSs, from which the MCS is selected, and selecting the MCS from the respective MCSs.

In a fourteenth aspect, alone or in combination with one or more of the first through thirteenth aspects, the MCS is selected from a set of MCSs at a MAC layer of the UE, and the sidelink communication is transmitted based at least in part on an indication, that identifies at least one of the MCS or the set of MCSs, from the MAC layer to a physical layer of the UE.

In a fifteenth aspect, alone or in combination with one or more of the first through fourteenth aspects, process 500 further includes transmitting sidelink control information that identifies at least one of the MCS or a set of MCSs from which the MCS is selected.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
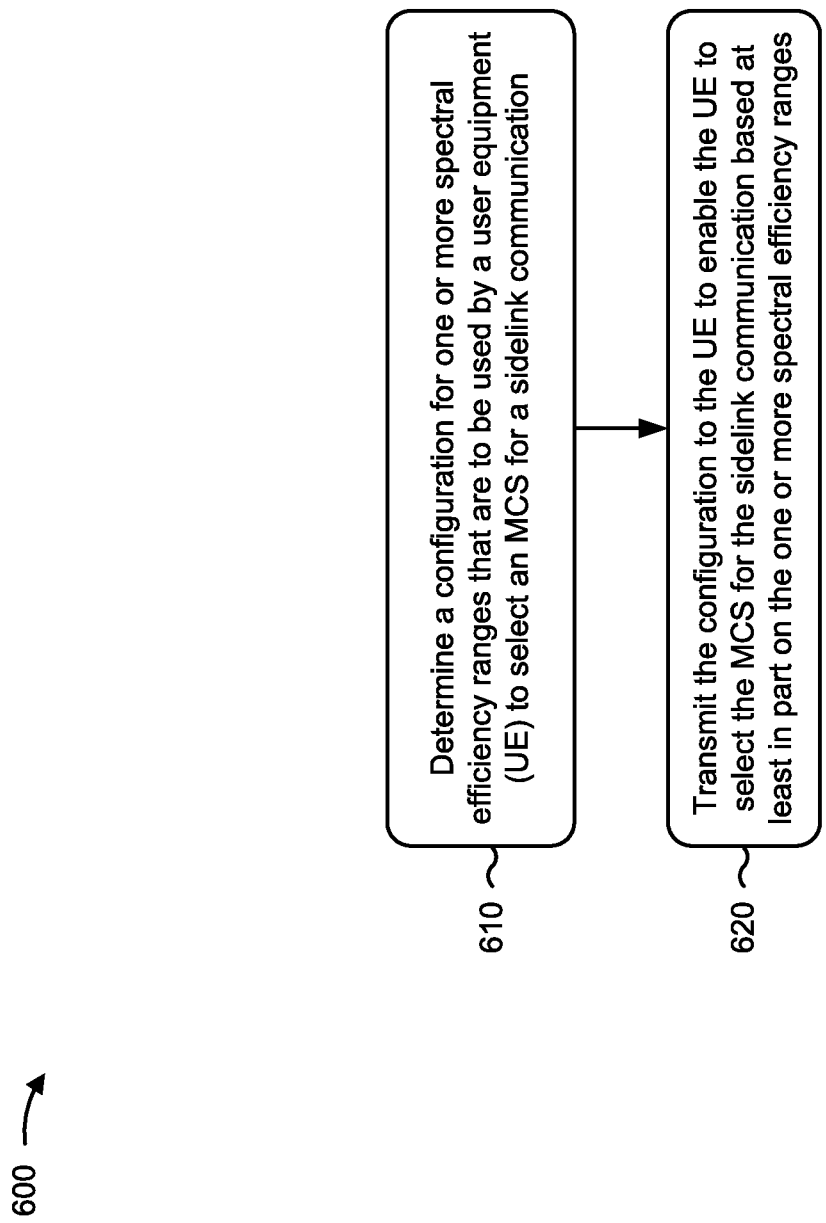
FIG. 6 is a diagram illustrating an example process performed, for example, by a base station, in accordance with various aspects of the present disclosure.

FIG. 6 is a diagram illustrating an example process 600 performed, for example, by a base station, in accordance with various aspects of the present disclosure. Example process 600 is an example where a base station (e.g., base station 110 and/or the like) performs operations associated with MCS determination for sidelink communication.

As shown in FIG. 6, in some aspects, process 600 may include determining a configuration for one or more spectral efficiency ranges that are to be used by a UE to select an MCS for a sidelink communication (block 610). For example, the base station (e.g., using controller/processor 240 and/or the like) may determine a configuration for one or more spectral efficiency ranges that are to be used by a UE to select an MCS for a sidelink communication, as described above.

As further shown in FIG. 6, in some aspects, process 600 may include transmitting the configuration to the UE to enable the UE to select the MCS for the sidelink communication based at least in part on the one or more spectral efficiency ranges (block 620). For example, the base station (e.g., using controller/processor 240, transmit processor 220, TX MIMO processor 230, MOD 232, antenna 234, and/or the like) may transmit the configuration to the UE to enable the UE to select the MCS for the sidelink communication based at least in part on the one or more spectral efficiency ranges, as described above.

Process 600 may include additional aspects, such as any single aspect or any combination of aspects described below and/or in connection with one or more other processes described elsewhere herein.

In a first aspect, a spectral efficiency range of the one or more spectral efficiency ranges is associated with a first index value and a second index value of a mapping of index values to spectral efficiency values. In a second aspect, alone or in combination with the first aspect, a spectral efficiency range of the one or more spectral efficiency ranges is associated with an index value of a mapping of index values to spectral efficiency ranges.

In a third aspect, alone or in combination with one or more of the first and second aspects, the configuration for the one or more spectral efficiency ranges is determined based at least in part on a measurement associated with a set of resources for sidelink communications. In a fourth aspect, alone or in combination with one or more of the first through third aspects, the configuration for the one or more spectral efficiency ranges is determined based at least in part on a capability of the UE.

In a fifth aspect, alone or in combination with one or more of the first through fourth aspects, one or more sets of MCSs are enabled for the UE, and the UE is to select the MCS from the one or more sets of MCSs.

In a sixth aspect, alone or in combination with one or more of the first through fifth aspects, the one or more spectral efficiency ranges include a single spectral efficiency range. In a seventh aspect, alone or in combination with one or more of the first through sixth aspects, the one or more spectral efficiency ranges include a plurality of spectral efficiency ranges, and the plurality of spectral efficiency ranges are associated with a plurality of sets of MCSs enabled for the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
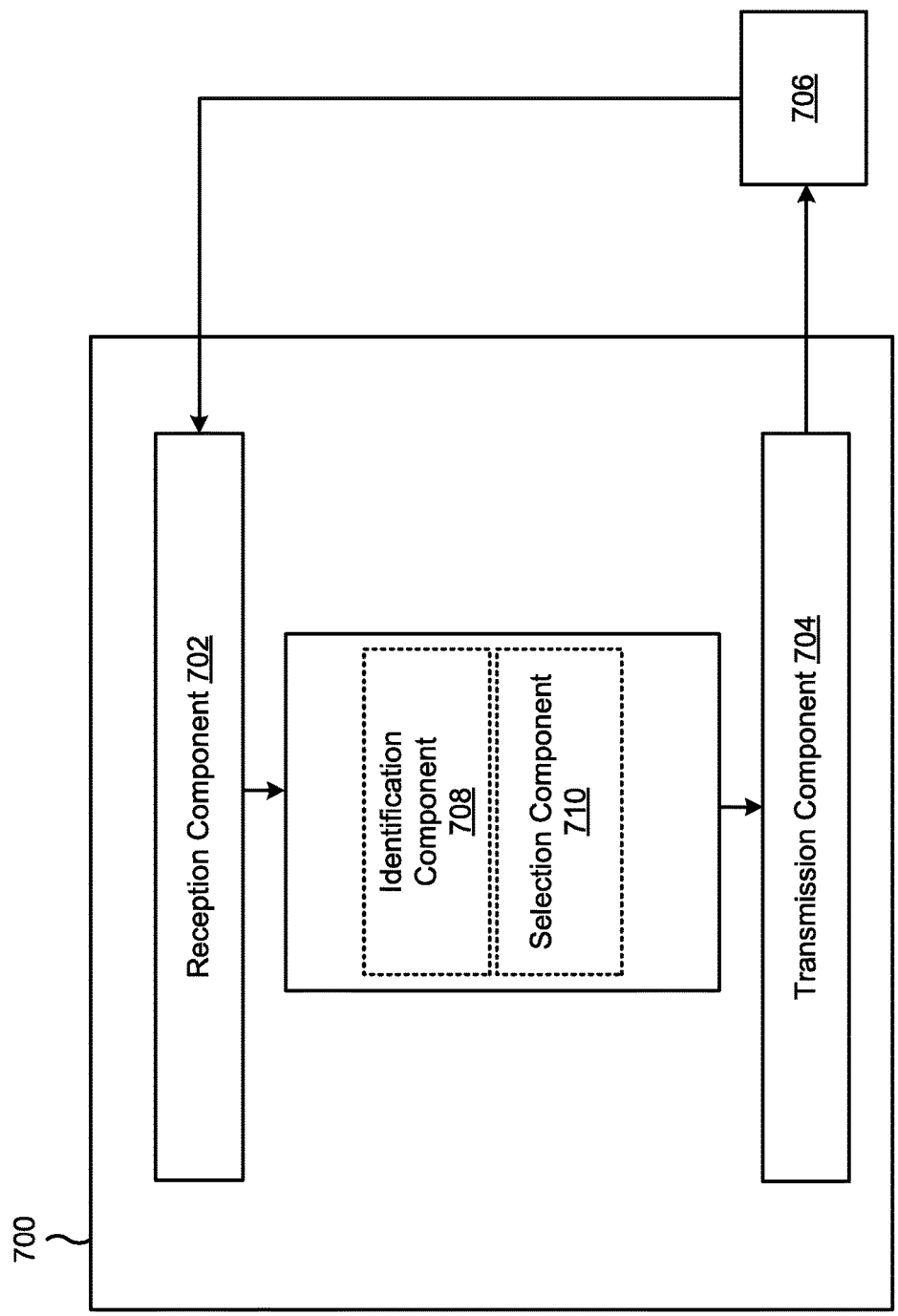
FIGS. 7-8 are diagrams illustrating example apparatuses for wireless communication, in accordance with various aspects of the present disclosure.

FIG. 7 is a diagram illustrating an example apparatus 700 for wireless communication, in accordance with various aspects of the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of an identification component 708 or a selection component 710, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The identification component 708 may identify one or more spectral efficiency ranges that are to be used to select an MCS for a sidelink communication. In some aspects, the identification component 708 may include a controller/processor, a memory, or a combination thereof, of the UE described above in connection with FIG. 2. The transmission component 704 may transmit the sidelink communication using the MCS selected based at least in part on the one or more spectral efficiency ranges.

The reception component 702 may receive a configuration that indicates the one or more spectral efficiency ranges, and the one or more spectral efficiency ranges may be identified based at least in part on the configuration.

The selection component 710 may select the MCS from a set of MCSs enabled for the apparatus, and the MCS may be associated with a spectral efficiency within the spectral efficiency range. In some aspects, the selection component 710 may include a controller/processor, a memory, or a combination thereof, of the UE described above in connection with FIG. 2.

The selection component 710 may select a set of MCSs from a plurality of sets of MCSs enabled for the apparatus. The selection component 710 may select the MCS from the set of MCSs selected, and the MCS may be associated with a spectral efficiency within the spectral efficiency range.

The selection component 710 may select respective MCSs from a plurality of sets of MCSs enabled for the apparatus, and each MCS may be associated with a spectral efficiency within the spectral efficiency range. The selection component 710 may select the MCS from the respective MCSs.

The selection component 710 may select a set of MCSs from the plurality of sets of MCSs. The selection component 710 may select the MCS from the set of MCSs selected, and the MCS may be associated with a spectral efficiency within a spectral efficiency range, of the plurality of spectral efficiency ranges, that is associated with the set of MCSs.

The selection component 710 may select respective MCSs from the plurality of sets of MCSs, and each MCS may be associated with a spectral efficiency within a spectral efficiency range, of the plurality of spectral efficiency ranges, that is associated with a set of MCSs, of the plurality of sets of MCSs, from which the MCS is selected. The selection component 710 may select the MCS from the respective MCSs.

The transmission component 704 may transmit sidelink control information that identifies at least one of the MCS or a set of MCSs from which the MCS is selected.

The quantity and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

Figure 8:
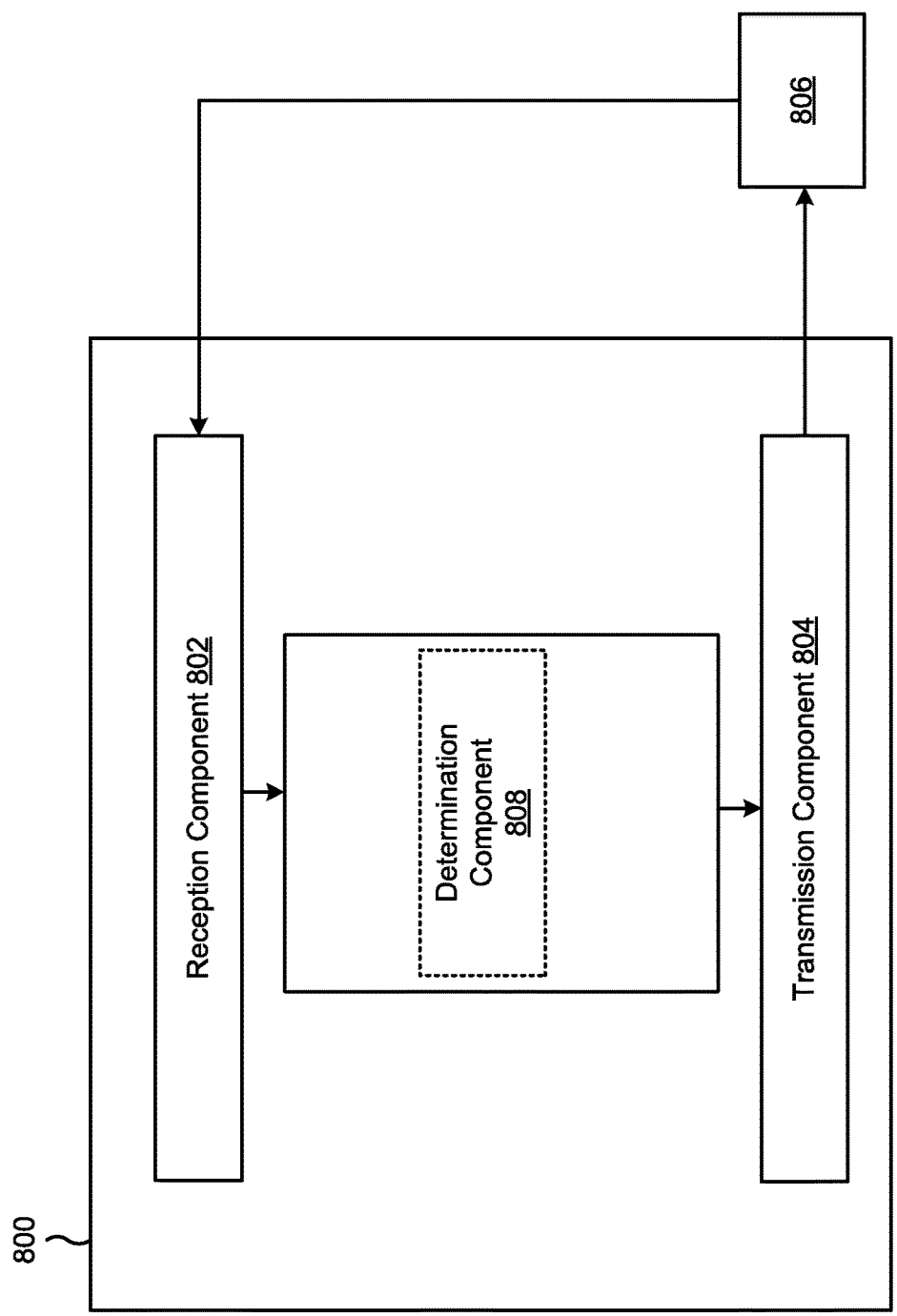

FIG. 8 is a diagram illustrating an example apparatus 800 for wireless communication, in accordance with various aspects of the present disclosure. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808, among other examples.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The determination component 808 may determine a configuration for one or more spectral efficiency ranges that are to be used by a UE to select an MCS for a sidelink communication. The transmission component 804 may transmit the configuration to the UE to enable the UE to select the MCS for the sidelink communication based at least in part on the one or more spectral efficiency ranges.

The quantity and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   identifying one or more spectral efficiency ranges that are to be used to select a modulation and coding scheme (MCS) for a sidelink communication, wherein the UE is configured with the one or more spectral efficiency ranges based at least in part on whether the UE is capable of communicating using a particular modulation order;
   selecting a set of MCSs from a plurality of sets of MCSs enabled for the UE, wherein the set of MCSs include respective MCSs from the plurality of sets of MCSs, wherein the set of MCSs are associated with a spectral efficiency within a spectral efficiency range of the one or more spectral efficiency ranges, and wherein the MCS is selected from the set of MCSs; and
   transmitting the sidelink communication using the MCS selected from the set of MCSs.

2. The method of claim 1, wherein the spectral efficiency range is associated with a first index value and a second index value of a mapping of index values to spectral efficiency values, wherein the first index value corresponds to a lower bound of the spectral efficiency range and the second index value corresponds to an upper bound of the spectral efficiency range.

3. The method of claim 1, wherein the spectral efficiency range is associated with an index value of a mapping of index values to spectral efficiency ranges.

4. The method of claim 1, further comprising:
   receiving a configuration that indicates the one or more spectral efficiency ranges,
      wherein the one or more spectral efficiency ranges are identified based at least in part on the configuration.

5. The method of claim 1, wherein the one or more spectral efficiency ranges are further based at least in part on a measurement associated with a set of resources for sidelink communications.

6. The method of claim 1, wherein the one or more spectral efficiency ranges include a single spectral efficiency range.

7. The method of claim 6, wherein the spectral efficiency is within the spectral efficiency range.

8. The method of claim 1, wherein the one or more spectral efficiency ranges include a plurality of spectral efficiency ranges, and
   wherein the plurality of spectral efficiency ranges are associated with the plurality of sets of MCSs enabled for the UE.

9. The method of claim 8, wherein the spectral efficiency is within a spectral efficiency range, of the plurality of spectral efficiency ranges, that is associated with the set of MCSs.

10. The method of claim 1, wherein the MCS is selected from the set of MCSs at a medium access control (MAC) layer of the UE, and
    wherein the sidelink communication is transmitted based at least in part on an indication, that identifies at least one of the MCS or the set of MCSs, from the MAC layer to a physical layer of the UE.

11. The method of claim 1, further comprising:
transmitting sidelink control information that identifies at least one of the MCS or the set of MCSs from which the MCS is selected.

12. A user equipment (UE) for wireless communication, comprising:
a memory; and
one or more processors coupled to the memory, the one or more processors configured to:
identify one or more spectral efficiency ranges that are to be used to select a modulation and coding scheme (MCS) for a sidelink communication, wherein the UE is configured with the one or more spectral efficiency ranges based at least in part on whether the UE is capable of communicating using a particular modulation order;
select a set of MCSs from a plurality of sets of MCSs enabled for the UE, wherein the set of MCSs include respective MCSs from the plurality of sets of MCSs, wherein the set of MCSs are associated with a spectral efficiency within a spectral efficiency range of the one or more spectral efficiency ranges, and wherein the MCS is selected from the set of MCSs; and
transmit the sidelink communication using the MCS selected from the set of MCSs.

13. The UE of claim 12, wherein the spectral efficiency range is associated with a first index value and a second index value of a mapping of index values to spectral efficiency values, wherein the first index value corresponds to a lower bound of the spectral efficiency range and the second index value corresponds to an upper bound of the spectral efficiency range.

14. The UE of claim 12, wherein the spectral efficiency range is associated with an index value of a mapping of index values to spectral efficiency ranges.

15. The UE of claim 12, wherein the one or more processors are further configured to:
receive a configuration that indicates the one or more spectral efficiency ranges,
wherein the one or more spectral efficiency ranges are identified based at least in part on the configuration.

16. The UE of claim 12, wherein the one or more spectral efficiency ranges are further based at least in part on a measurement associated with a set of resources for sidelink communications.

17. The UE of claim 12, wherein the one or more spectral efficiency ranges include a single spectral efficiency range.

18. The UE of claim 17, wherein the spectral efficiency is within the spectral efficiency range.

19. The UE of claim 12, wherein the one or more spectral efficiency ranges include a plurality of spectral efficiency ranges, and
wherein the plurality of spectral efficiency ranges are associated with the plurality of sets of MCSs enabled for the UE.

20. The UE of claim 12, wherein the MCS is selected from the set of MCSs at a medium access control (MAC) layer of the UE, and
wherein the sidelink communication is transmitted based at least in part on an indication, that identifies at least one of the MCS or the set of MCSs, from the MAC layer to a physical layer of the UE.

21. The UE of claim 12, wherein the one or more processors are further configured to:
transmit sidelink control information that identifies at least one of the MCS or the set of MCSs from which the MCS is selected.

22. A non-transitory computer-readable medium storing one or more instructions for wireless communication, the one or more instructions comprising:
one or more instructions that, when executed by one or more processors of a user equipment (UE), cause the one or more processors to:
identify one or more spectral efficiency ranges that are to be used to select a modulation and coding scheme (MCS) for a sidelink communication, wherein the UE is configured with the one or more spectral efficiency ranges based at least in part on whether the UE is capable of communicating using a particular modulation order;
select a set of MCSs from a plurality of sets of MCSs enabled for the UE, wherein the set of MCSs include respective MCSs from the plurality of sets of MCSs, wherein the set of MCSs are associated with a spectral efficiency within a spectral efficiency range of the one or more spectral efficiency ranges, and wherein the MCS is selected from the set of MCSs; and
transmit the sidelink communication using the MCS selected from the set of MCSs.

23. The non-transitory computer-readable medium of claim 22, wherein the spectral efficiency range is associated with a first index value and a second index value of a mapping of index values to spectral efficiency values, wherein the first index value corresponds to a lower bound of the spectral efficiency range and the second index value corresponds to an upper bound of the spectral efficiency range.

24. The non-transitory computer-readable medium of claim 22, wherein the spectral efficiency range is associated with an index value of a mapping of index values to spectral efficiency ranges.

25. The non-transitory computer-readable medium of claim 22, wherein the one or more processors, when executed by the UE, further cause the UE to:
receive a configuration that indicates the one or more spectral efficiency ranges, wherein the one or more spectral efficiency ranges are identified based at least in part on the configuration.

26. The non-transitory computer-readable medium of claim 22, wherein the one or more spectral efficiency ranges are further based at least in part on a measurement associated with a set of resources for sidelink communications.

27. The non-transitory computer-readable medium of claim 22, wherein the MCS is selected from the set of MCSs at a medium access control (MAC) layer of the UE, and
wherein the sidelink communication is transmitted based at least in part on an indication, that identifies at least one of the MCS or the set of MCSs, from the MAC layer to a physical layer of the UE.

28. The non-transitory computer-readable medium of claim 22, wherein the one or more processors, when executed by the UE, further cause the UE to:
transmit sidelink control information that identifies at least one of the MCS or the set of MCSs from which the MCS is selected.

29. An apparatus for wireless communication, comprising:
means for identifying one or more spectral efficiency ranges that are to be used to select a modulation and coding scheme (MCS) for a sidelink communication, wherein the apparatus is configured with the one or more spectral efficiency ranges based at least in part on whether the apparatus is capable of communicating using a particular modulation order;

means for selecting a set of MCSs from a plurality of sets of MCSs enabled for the apparatus, wherein the set of MCSs include respective MCSs from the plurality of sets of MCSs, wherein the set of MCSs are associated with a spectral efficiency within a spectral efficiency range of the one or more spectral efficiency ranges, and wherein the MCS is selected from the set of MCSs; and means for transmitting the sidelink communication using the MCS selected from the set of MCSs.

30. The apparatus of claim 29, wherein the spectral efficiency range is associated with a first index value and a second index value of a mapping of index values to spectral efficiency values, wherein the first index value corresponds to a lower bound of the spectral efficiency range and the second index value corresponds to an upper bound of the spectral efficiency range.

\* \* \* \* \*